May 12, 1953      H. W. DRYDEN      2,637,922
FOWL MARKER
Filed June 4, 1949
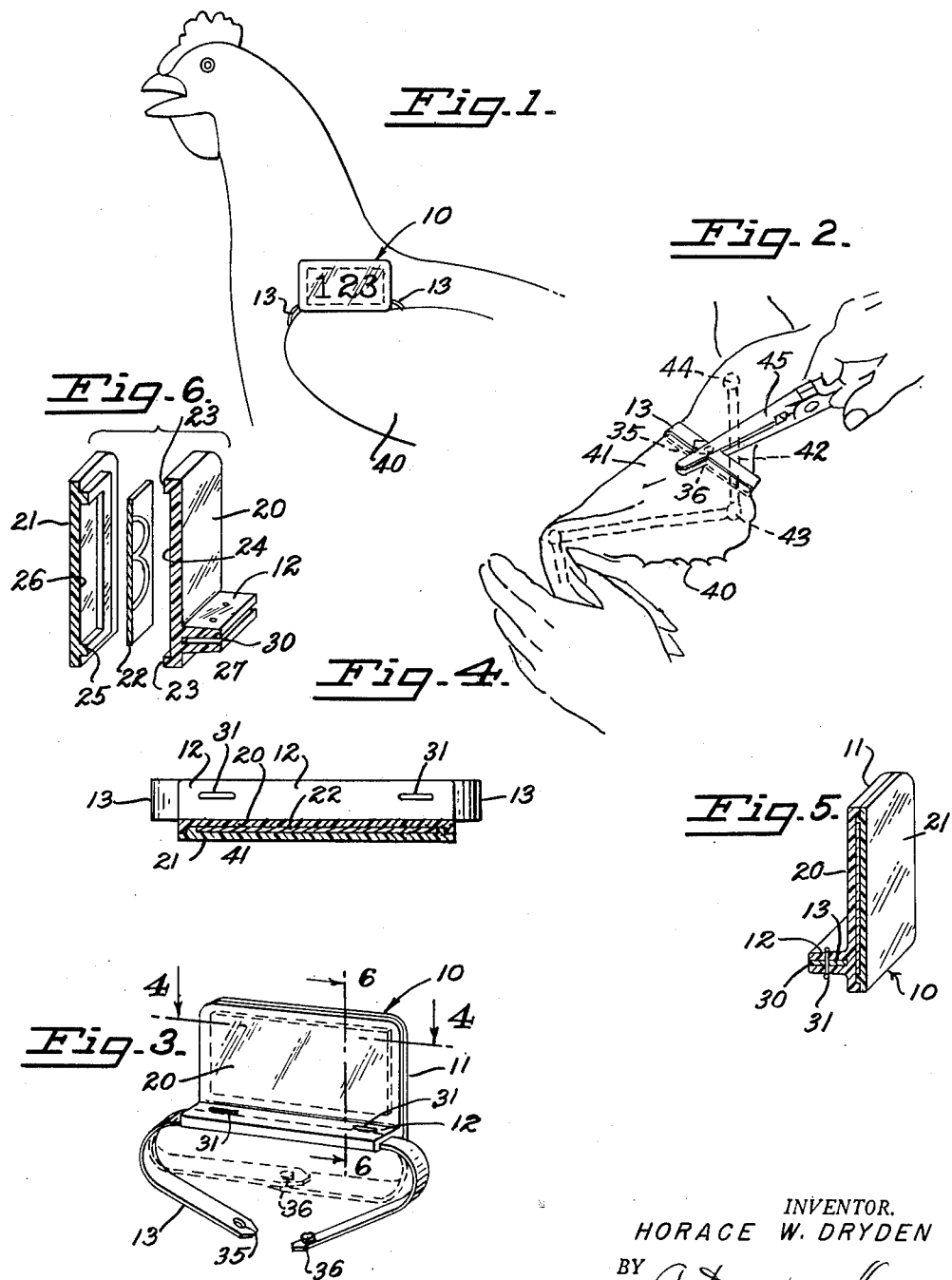
INVENTOR.
HORACE W. DRYDEN
BY
ATTORNEY Patented May 12, 1953

2,637,922

UNITED STATES PATENT OFFICE 2,637,922
FOWL MARKER
Horace W. Dryden, Modesto, Calif.
Application June 4, 1949, Serial No. 97,193
4 Claims. (Cl. 40—3)

This invention relates to an apparatus for marking animals, including fowl. More particularly, it relates to a marker for fowl which is placed on the bird's wing so that it can always be seen clearly.

The trouble with most markers for fowl is that they are hard to read or are too easily displaced, or injure the bird when they are being worn.

Leg bands are hard to read. The bird has to be lifted to read the number on a leg band, in addition to which there is the problem of first catching the bird. The numerals on the band are usually obscured because chickens' legs are close to the ground and become coated with mud or dust. The band has to be small, which means the numbers are small. The band is curved around in a small circle so that the whole number cannot be read without rotating the band or the chicken.

Wing tags (typified by the Renshaw Patent No. 881,152) have heretofore come off too easily, have tended to injure the bird, and have also been difficult to read. They have comprised wires passed around the wing, with a tag pressed around the wire. This narrow wire (like Renshaw's) tends to cut into the wing and harm the bird both physically and nervously; with hens it may result in greatly decreased egg production. At the same time, the wire or tag is apt to catch on things and come unfastened, and it is also apt to come unfastened as a result of the bird beating its wings because of the nervous effect of the irritating wire.

Even while the wire loop stays on, the tag is apt to be covered by feathers and to slip back and forth along the wire and to rotate around the wire; it will seldom, and only by chance, hang in a satisfactory reading position. Even when it does, the numbers are too small to be read at a distance and cannot be made large without increasing both the irritation on the bird and the likelihood of the tag laying over on the wire. Legibility at all times cannot be assured.

The present invention solves the problems of marking birds.

The object of the invention is to provide a badge that can be read some distance away from the bird, without having to touch the bird; to provide a badge that will not come off accidentally; to provide a badge that will not injure the bird or interfere in any way with its movements; to provide an economical, easily applied wing badge; and to provide a wing badge that will always be supported in easy reading position.

Other objects and advantages of the invention will become clear from the following description. I have described in detail a badge which embodies the invention, but I do not mean thereby to imply that the invention is limited to such details, as I understand the description is merely illustrative, and that the scope of the invention is defined by the claims.

The above objects are achieved in the fowl marker of this invention which summarized includes a transparent plastic case having a large easily read number secured within it, an outwardly projecting flange on the back of the case to serve as a support to position the case on the wing and to serve as a fastening for a broad flat strap which is formed into a loop around the wing near the body in such a way that the loop is smaller than the widest part of the wing and therefore cannot slide off the wing.

This is illustrated in the drawings where,

Fig. 1 is a view in side elevation of the upper portion of a fowl showing where the case and number are positioned, in this instance on the left wing;

Fig. 2 is a view of the underside of the extended right wing showing the marker being applied by pliers which will secure the band together. The wing bones and covering flesh are shown diagrammatically.

Fig. 3 is a view in perspective looking at the complete marker from the rear;

Fig. 4 is a view in section along the line 4—4 in Fig. 3;

Fig. 5 is a view in perspective and partly in cross-section looking at the marker from one side; and Fig. 6 is an exploded view in perspective and partly in cross-section taken along the line 6—6 in Fig. 3 with the strap omitted.

I prefer to make the case out of a light-weight transparent plastic, and this is the type of case shown in the drawings; however, other materials could be used.

The wing badge and marker 10 is composed of the case 11, having the offset supporting flange 12, and the broad flat strip metal loop 13 secured to the flange.

The case 11 has the base member 20 and the face member 21. The base member has a raised peripheral rim 23 around its front side (see Fig. 6) to form a wide flat pocket 24. The transparent face member 21 has an inset rim 25 about the same height as the rim 23 which fits snugly beside the rim 23 when the base and face are put together (see Fig. 5).

The identification card 22 fits in the pocket 26 formed inside the rim 25. When the case 11 is assembled, the card 22 is held securely between the base and the face, and its large numbers show clearly through the transparent face. The case 11 preferably is assembled by moistening the abutting parts of the base and the face with a plastic solvent (e. g. acetone) and then pressing these parts together with the card 22 in between so the case becomes a one piece unit.

It is sealed so the number card is always clean and it cannot fall out or get lost.

The offset supporting flange 12 may be molded in one piece with the base 20, or it may be cemented to it or fixed to it in some other suitable manner. Preferably it is perpendicular to the body 11 and is located a short distance above the bottom edge 27. When the badge is placed on a bird, the flange 12 rests on top of the wing and helps to support the case 11 at all times in a generally vertical position (see Fig. 1).

Preferably the flange 12 has a longitudinal slot 30 (Fig. 6), to receive the loop member 13. This may be affixed to the flange 12 by the staples 31, or in some other way. The loop 13 could be stapled (or otherwise affixed) to the upper or lower edge of the flange 12 instead of being held in the slot 30. In that case the slot could be omitted. The loop may be made of aluminum or any other suitable metal.

The loop 13 is made wide and thin. By being relatively wide it will not chafe or cut into the bird's flesh. By being relatively thin the loop is easily formed around the wing. The loop is closed down to a size to fit around the wing 40 and forms a loose loop around the wing web 41 and bone 42 between the first joint 43 and the body joint 44 (see Fig. 2).

The first and second bones of a bird's wing are overlaid with a skin web 41 which stretches into a wedge shaped generally horizontal form when the wing is extended. The narrow end of the wedge is at the body of the bird. When the wing is folded in against the side of the bird's body the bulk of flesh, meat and feathers around the first joint 43 is greater than the bulk along the first bone 42 between the joint 43 and the body.

This means that the loop 13 can be placed around the first bone of the wing, adjacent the body, and closed at its ends 35 and 36 with the loop slidable partway along the first bone 42, but with the loop size too small to slide over the bulk of flesh, meat and feathers at the first joint 43. The loop does not pass through the flesh of the wing, making it easy to install and minimizing the chance for any soreness of the wing. When formed around the wing the loop 13 has a generally oblong shape with its long dimension extending generally in the direction of the supporting flange 12.

At the two ends of the strip 13 are the catches. This may be a hole-and-rivet catch as shown (the hole is numbered 35 and the rivet 36 in Fig. 3); or it may be a slot-and-flap arrangement where the flap is put through a slot and folded down. It is important that it be a permanent catch, so that the ends of the loop cannot disconnect.

Fig. 2 shows how the marker is placed on a bird. It may go on either wing. Here the right wing 40 is opened out with one hand, and the strip 13 is folded around the wing between the body joint 44 and the first joint 43. The catch 35, 36 is closed, completing the loop. The rivet 36 is then preferably clamped by a pair of long-nosed pliers 45, to make sure that it can never come off accidentally.

An important feature of the present invention is that when the badge is on, the offset flange 12 rests on top of the wing 40 (see Fig. 1) where it supports the case 11 in a generally upright position. The number in the case is easily read from a distance. It will stay reasonably clean because it is on the wing away from the dirt of the yard and because the plastic case is smooth and tends to shed dirt. The marker cannot slip off the wing and it does not interfere in any way with the bird's normal life. It does no physical injury to the bird; does not interfere with breeding; does not hamper circulation; and it does not lend itself to use as a weapon in fighting between birds.

Because the strip 13 is broad and thin it does not dig into the bird's flesh, but always rests evenly on the bird. Also because it is flat, it supports the flange 12 substantially in one position. This means that a large light-weight badge can be used and that it will always be in the same balanced upright position. There is no chance for it to lay over because the band 13 is too wide, and it cannot slide along the band because it is stapled in position. The numbers can be made as large as desired without injuring the bird, and can be read at a distance of twenty to forty feet. The flat strip cannot come off once the catch 35, 36 is secured, and the badge is held vertically for the life of the bird. Thus this marker is completely readable at all times.

I claim:

1. A fowl marker comprising a relatively large wing badge member having an identifying insignia visible from one face thereof and adapted to be supported in an upright position from the base of the wing structure, a relatively wide flange rigid therewith and projecting from the opposite face thereof and normal thereto, the flange being adjacent an edge of the member and extending lengthwise thereof for seating engagement on the said base portion of the wing, said flange having opposite end extensions of bendable band form disposed in a plane parallel to said member and having terminal securing means, the extensions being substantially rigid transversely thereof and being of a length to provide with the intermediate flange upon engagement of the securing means a relatively wide loop member for loosely embracing the said wing base portion between the opposing surfaces thereof.

2. A fowl marker according to claim 1, wherein said flange is provided with a longitudinal slot, said extensions constituting the end portions of a band whose central body portion is disposed within said slot, and means extending through the flange and said band central portion for holding same in position.

3. A fowl marker according to claim 1, wherein said flange is disposed in relatively close spaced relation to the lower edge of said member.

4. The structure according to claim 1, wherein said member comprises a base portion from which said flange projects, a transparent face member secured to the face of said base portion opposite said flange and a card bearing said identifying insignia disposed between said base portion and said face member.

HORACE W. DRYDEN.

References Cited in the file of this patent

UNITED STATES PATENTS

| Number | Name | Date |
|---|---|---|
| 881,152 | Renshaw | Mar. 10, 1908 |
| 1,661,506 | Sanders | Mar. 6, 1928 |
| 1,885,282 | O'Conner | Nov. 1, 1932 |
| 2,095,481 | Skopec | Oct. 12, 1937 |
| 2,114,135 | Butler | Apr. 12, 1938 |
| 2,595,623 | Dryden | Apr. 29, 1952 |

FOREIGN PATENTS

| Number | Country | Date |
|---|---|---|
| 555,427 | England | Aug. 23, 1943 |